June 10, 1969  J. L. LEGGETT  3,448,991
VEHICLE STEERING CONTROL
Filed June 7, 1967  Sheet 1 of 2

Inventor:
James L. Leggett
By Wilmer Mecklin
his Attorney

Inventor:
James L. Leggett
By Wilmer Mechlin
his Attorney

United States Patent Office 3,448,991
Patented June 10, 1969

3,448,991
VEHICLE STEERING CONTROL
James L. Leggett, 760 Amherst Drive,
Abilene, Tex. 79603
Filed June 7, 1967, Ser. No. 644,344
Int. Cl. B62d 7/08
U.S. Cl. 280—94
14 Claims

ABSTRACT OF THE DISCLOSURE

A motor vehicle having a pair of front wheels steerable in unison and equipped with a steering control stabilizing the steerable wheels against accidental misalignment by pairs of compression spring units each acting laterally on a wheel, each unit including a pair of alternately acting compression springs reacting oppositely against a cross member mounting the adjoining steerable wheel.

Background of the invention

Motor vehicles and trailers with four or more wheels conventionally have their steerable wheels arranged in pairs with the wheels of each pair pivotally mounted at opposite ends of a cross member and steerable in unison through a suitable linkage. The paired steerable wheels are prone to misalignment by upsetting of their adjustments by road shocks and wear in their mountings and steering mechanisms and, while correctable by periodic adjustment and replacement of worn parts, misalignments of this type are a prime expense in mechanical maintenance and source of tire wear. From a safety standpoint, misalignments of another type are more serious for motor vehicles having paired steerable wheels and equally serious for those steered by single wheels, such as motorcycles. These are the sudden, unexpected misalignments occurring when a tire blows out or wheel strikes a curb or comparable obstacle or there is a break in the linkage between a wheel and the steering column. If the sudden misalignment is due to a linkage break, the driver cannot but lose control and even for a vehicle equipped with power steering, control at best will be difficult and too often will be lost when a tire blows out or a wheel strikes a substantial obstacle.

A solution to the problems posed by missalignments of both types is disclosed in Worsham Patent No. 2,993,704, issued July 25, 1961, and the stabilizing attachment of that patent has been produced in quantity for and proved effective on trucks. It is to these same problems that the present invention is directed.

Abstract of the invention

The primary object of the present invention is to provide an improved steering control for stabilizing a steerable wheel of a motor or other vehicle, which is simple and more universally applicable than the attachment of the Worsham patent and effective not only for enabling a driver to retain control on occurrences heretofore responsible for sudden misalignments but also in drastically reducing wear of tires and mechanical parts and practically eliminating the need for periodic realignments or front end checks.

The preferred improved control depends for stabilizing each steerable wheel upon a pair of compression spring units acting laterally on the wheel and each having a guide rod pivotally connected at an outer end to an adjoining wheel in front or back of the wheel's pivot or turning axis and extending laterally of the vehicle through a reactance member fixed to the member mounting the wheel. On the rod at opposite sides of and reacting oppositely against the reactance member are outer and inner compression springs which alternately are compressed by and act in opposing turning of the wheel, the outer by pushing or pressing against turning in the direction of the unit and the inner by pulling or tensioning against turning in the opposite direction. A single wheel and, in a large vehicle, usually each paired wheel will have front and rear compression spring units, while on most automobiles a front unit on each of the paired wheels ordinarily will suffice. In the preferred control the outer springs are weaker and serve to eliminate vibration and somehow facilitate steering and both outer and inner springs are precompressed in normal position with the precompression of at least the inner springs adjustable.

With the above its principal objectives, other objects and advantages of the invention will appear hereinafter in the description, be particularly pointed out in the appended claims and be illustrated in the accompanying drawings, in which:

Figure description

Detailed description

Figure 1:
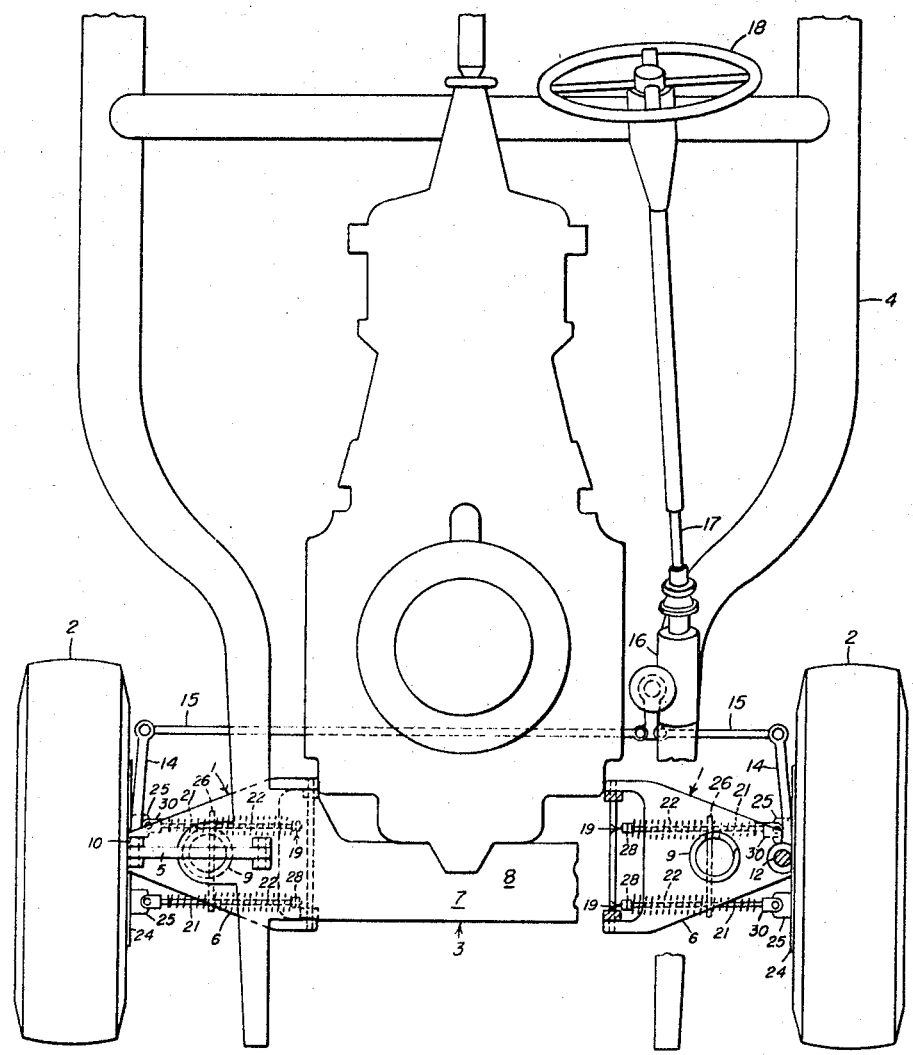
FIGURE 1 is a somewhat schematic fragmentary plan view of the front part of the understructure of a motor vehicle incorporating a preferred embodiment of the steering control of the present invention.
Figure 2:
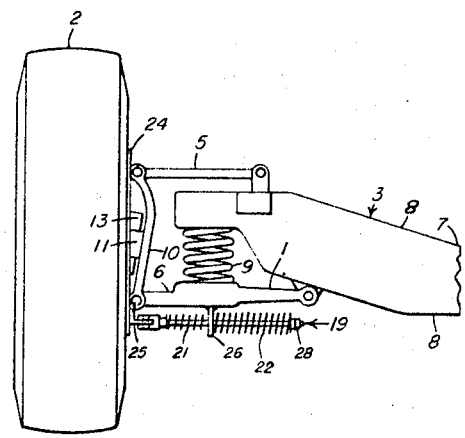
FIGURE 2 is a fragmentary front elevational view of the structure of FIGURE 1.

Referring now in detail to the drawings in which like reference characters designate like parts, the improved steering control of the present invention, while applicable even to motorcycles or three-wheeled vehicles for stabilizing a single steerable wheel, is particularly designed for motor or other vehicles having one or more pairs of linked steerable wheels and will be so described as exemplary of the invention.

In the illustrated embodiment, the improved control, designated as 1, has been applied to a motor vehicle steered conventionally through a pair of steerable front wheels 2, which are mounted for horizontal pivoting about substantially vertical axes at opposite ends of a front cross member 3 fixed to and forming part of the vehicle's frame or chassis 4. In some vehicles the cross member 3 in whole may be a fixed member directly mounting the wheels 2 but, more usually, the vehicle will have a so-called "knee action" suspension in which, as in the illustrated embodiment, the cross member has movable end portions, each mounting a wheel and formed by upper and lower control arms 5 and 6 and a fixed intermediate portion 7 rigid with the balance of the frame 4.

Connected at their inner ends for vertical pivoting to upper and lower or vertically facing sides 8 of the fixed portion 7 inwardly of a coil or other front suspension spring 9 acting vertically between that portion and the lower control arm 6, the latter and the upper control arms 5 at each side of the vehicle are connected at their outer ends for vertical swinging in unison by a connecting member, which, depending on the installation, may be a steering knuckle or, as illustrated, a vertical arm 10 having fixed thereto a knuckle 11 connected by a kingpin 12 to a steering knuckle or spindle 13 on the wheel. Turning about substantially vertical turning axes, here the axes of the kingpins 12, the wheels 2 are linked or connected for turning in unison in steering the vehicle by longitudinally, here rearwardly, extending steering arms 14, one fixed to each wheel, the steering arms being connected at their outer ends by laterally extending tie rods 15 to each other and a steering gear 16 at the lower end of a steering column 17, the illustrated column being turned conventionally by a steering wheel 18.

For any installation the improved control is comprised of one or more pairs of controllers or compression spring units 19, each pair forming a stabilizer 20 for stabilizing either a single wheel or a pair of linked or connected wheels. Each controller or unit 19 includes outer and inner springs 21 and 22, respectively, both of which are compression and suitably coil springs. Mounting the springs of each unit is a guide or mounting rod 23 suitably clevised at its outer end for connection for horizontal pivoting to an adjoining wheel in front or back of the wheel's center or turning axis and at a level which, as illustrated, may be below the lower control arm 6. Ordinarily, each guide rod 23 will be connected to a backing plate 24 of the adjoining wheel, as through a connecting bracket or wheel clip 25 fixed to the plate but, if the wheel lacks such a plate, can readily be connected to the wheel's spindle 13 through a suitable adapter (not shown) fixed thereto.

The guide rods 23 preferably are substantially horizontally disposed and, inwardly of the wheels, extend laterally of the frame or chassis 4, each through a reactance member 26 mounted on and fixed to or rigid with an adjoining end part of the cross member 3, which, for the illustrated knee action suspension, conveniently may be the adjoining lower control arm 6. For accommodating the relative angling of the guide rods and reactance members without the play that would otherwise be involved, each reactance member 26 preferably slidably receives the associated guide rod in a pivot bearing 27. The preferred guide rods 23 are threaded on their inner ends to receive adjusting and lock nuts 28.

Each guide rod 23 mounts the outer or "wheel" spring 21 and inner or "stabilizing" spring 22 of its unit 19 on opposite sides of the reactance member 26, each preferably between collars or washers 29, the outer spring on the outer or wheel side between the member and the clevis 30 on the rod's outer end and the inner spring on the inner or opposite side between the member and the nuts 28. If, in the particular installation, each steerable wheel is fitted with two of the controllers or compression spring or controller units 19, both units may have the same or a common reactance member 26, suitably in the form of a plate extending longitudinally of the frame 4 parallel to the normal, aligned or straight ahead position of the associated wheel and conveniently welded or otherwise fixed to and depending from the underside of the adjoining or related control arm 6.

The outer and inner springs 21 and 22 of each unit 19 preferably are precompressed to hold them tight against the associated reactance member 26 over the range of turning of the wheel or wheels 2 and also to predetermine the forces with which they will resist turning of the wheel or wheels upon which they act. In addition the normal or at rest compression and consequent resistance to wheel turning of at least the outer springs 22, desirably is adjustable after the initial installation, this being permitted in the illustrated embodiment by the adjusting and lock nuts 28. So normally compressed, the springs of each unit, by reacting oppositely against the interposed reactance member 26, will to a degree resist or oppose turning of the related wheel or wheels in either direction. However if, as preferred, the inner springs are substantially stronger than the outer, it will be the outer springs, primarily, that oppose turning of any steerable wheel to which they are operatively connected.

As mentioned earlier each steerable wheel is operatively connected to or acted upon by a pair of the controller units 19. The illustrated arrangement in which each steerable wheel is fitted with a pair of controller units having normally parallel guide rods 23, one connected in front and the other in back, behind or to the rear of the wheel's turning axis is necessary for a motor vehicle having a single steerable wheel and also is desirable for trucks or heavier automobiles. In this arrangement the corresponding guide rods at opposite sides of the vehicle are axially aligned in their normal condition and it is preferred that the front units be longitudinally offset relative to the wheels' turning axes more than those at the rear so that the stabilizer 20 formed by the pair of units at each side will be forwardly offset, rather than longitudinally centered, relative to the adjoining wheel's turning axis or center. For lighter vehicles steered by linked steerable wheels, the rear units can be dispensed with, in which case the remaining front units, by acting on both wheels, one directly and the other through the steering arms 14 and tie rods 15, will be the companion or paired units needed for stabilizing any steerable wheel.

Figure 4:
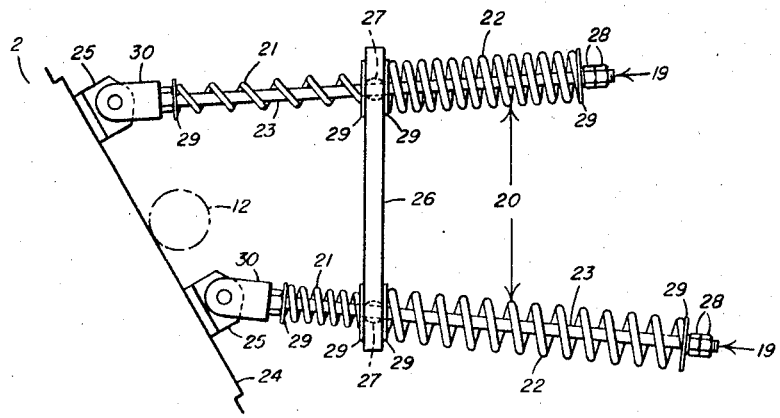
FIGURE 4 is a view similar to FIGURE 3 showing the conditions of the units when the wheel is turned in one direction.
Figure 3:
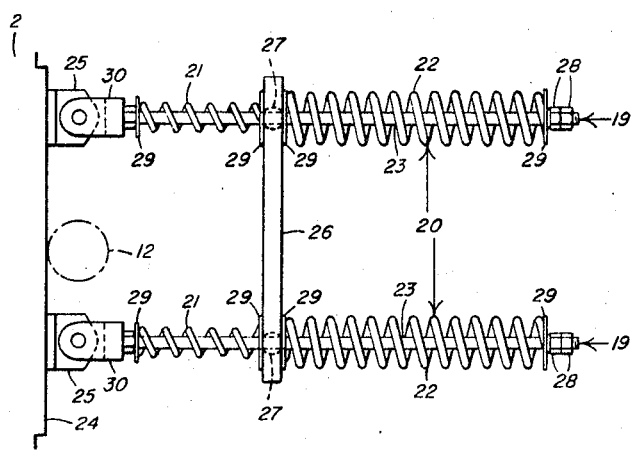
FIGURE 3 is a fragmentary plan view on an enlarged scale, showing a front and rear pair of stabilizing units in their normal, wheel-aligned or straight ahead condition.
Figure 5:
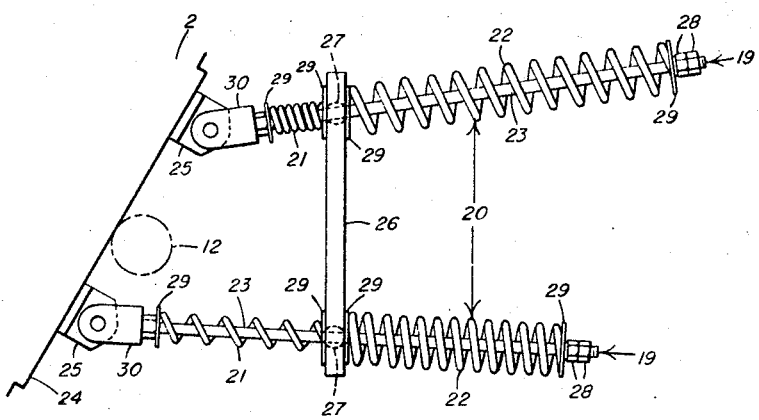
FIGURE 5 is a view similar to the FIGURE 4 but with the wheel turned in the opposite direction.

Whether each wheel has its own or linked wheels share a pair of controller units 19, the action on turning of the related wheel or wheels will be the same. Thus, as in FIGS. 4 and 5, showing the action of a pair of units on the left front wheel of the illustrated motor vehicle, turning of a related wheel in one direction will compress an outer spring 21 of one unit and the opposite, contrary or inner spring 22 of the other unit and, conversely, the inner spring of the one and outer spring of the other unit will be compressed when the wheel is turned in the opposite direction. The springs of each unit consequently act alternately, each by being compressed resisting turning of the wheel in only one of its two directions. While the springs of each unit are compressed, the outer when the adjoining wheel is turned in its direction and the inner on turning of the wheel in the opposite direction, the springs act not only alternately but oppositely in resisting turning of the wheel because of their disposition at opposite side of their reactance member 26, the outer on compression exerting a lateral pushing force or pressure and the inner a lateral pulling force or tension for restoring the wheel to normal condition, with the leverage or moment arm of either force the longitudinal offset of the point of connection of the unit to the adjoining wheel from the latter's turning axis.

As the preferably stronger inner springs 22 of each stabilizer 20 together oppose turning of the related wheel or wheels in either direction, it might seem that the outer springs 21 could be dispensed with. However, this has not proved to be the case. Not only are the outer springs necessary to eliminate vibration and prevent any tendency to oversteer but, for some thus far inexplicable reason, they also facilitate steering such that a vehicle with the improved control can be steered normally as readily as and with no appreciable increase in effort over a comparable vehicle not so equipped.

As mentioned earlier, heavier vehicles should have each steerable or turnable wheel equipped with a pair of the controller units 19 and, as might be expected, the strengths of the springs and other components of the improved control will vary in proportion to vehicle weight over the full range of weights of wheeled motor vehicles, even though any given control can cover a considerable part of the range. Undetrimental to normal steering, the improved control presents any vehicle to which it is applied with numerous benefits. The lateral pulling force or tension and pushing force or pressure constantly applied to any steerable wheel, respectively by the inner springs 22 and outer springs 21, will hold the wheel or wheels laterally steady without shimmy or wobble in normal driving and in case of a sudden misaligning force, such as a blowout, jumping a curb or a skid, will immediately force the wheels to return to steering alignment and respond to the control of the driver and this result the improved control produces even at high speeds. Also, as opposed to power steering, the improved control will hold a vehicle straight on the road even when the sudden force is applied when the driver has his hands off the steering wheel or on loss of steerability by breaking of a tie rod or other critical component in the linkage or train between the wheels and the steering column 17, so that the vehicle can be brought to a controlled stop by applying the brakes. Not only does the improved control guard against sudden misaligning forces but the constant lateral tension and pressure applied to the steerable wheel or wheels drastically reduces tire wear and, particularly on vehicles steered by one or more linked pairs of steerable wheels, practically eliminates ball joint play and any need for wheel alignment and other maintenance of the wheel mountings and steering mechanism. Too, on both heavier vehicles having individual wheel stabilizers with the preferred front offset and lighter vehicles having only front controller units, the higher tension at the front makes unnecessary the otherwise essential but wear-producing forward tow-in.

From the above detailed description it will be apparent that there has been provided an improved steering control, which, without adversely affecting normal steering, effectively stabilizes steerable wheels against misalignment from sudden misaligning forces and minimizes tire wear and both wear and maintenance of wheel mountings and steering mechanisms.

Having now described my invention, I claim:

1. In a wheeled vehicle having a frame and at least one steerable wheel mounted thereon for horizontal turning about a turning axis, a steering control comprising a plurality of spaced compression spring units extending laterally of said frame and independently connected to said wheel longitudinally beyond said turning axis thereof, each unit including reactance means fixed to said frame and outer and inner compression springs reacting oppositely against said reactance means and alternately compressed by turning of said wheel each on turning thereof in one direction for opposing said turning, said outer and inner springs on compression thereof exerting respectively pressure and tension on said wheel, and the corresponding springs of said units being alternately compressed each on turning of said wheel in one direction.

2. A steering control according to claim 1, wherein each unit includes guide means mounting the springs thereof and extending laterally of the frame, and said guide means outwardly of the related reactance means is connected for relative horizontal pivoting to an adjoining steerable wheel longitudinally beyond the turning axis thereof.

3. A steering control according to claim 2, wherein the springs are coil springs, and the guide means of each unit is a guide rod extending through the related reactance means and having an outer end pivotably connected to the adjoining wheel.

4. A steering control according to claim 3, wherein the inner spring of each unit is stronger than the outer spring thereof.

5. A steering control according to claim 4, wherein the reactance means for each unit is fixed to a part of the frame mounting the adjoining steerable wheel.

6. A steering control according to claim 5, wherein the vehicle has a pair of the steerable wheels mounted on opposite end portions of a cross member of the frame and connected for turning in unison, there are a pair of the units for each wheel, and the units of each pair are connected to the adjoining wheel in front and back of the turning axis thereof.

7. A steering control according to claim 6, wherein the guide rods of the pair of units for each wheel are substantially parallel in the straight ahead position of the wheel, and the reactance means for the springs of each pair is a common reactance member.

8. A steering control according to claim 5, wherein the vehicle has a pair of the steerable wheels mounted on opposite end portions of a cross member of the frame and connected for turning in unison, the wheels share a pair of the units, the units of the pair are at opposite sides of the frame and connected at laterally aligned points to the wheels, and one unit is connected to each wheel forwardly of the turning axis thereof.

9. A steering control according to claim 6, wherein the front unit for each wheel is connected thereto at a greater longitudinal offset from the turning axis thereof than the rear unit.

10. A steering control according to claim 6, wherein the steerable wheels are front wheels of the vehicle, the wheels are knee action suspended from the frame, each of the cross member end portions mounting the wheels includes a lower control arm connected for vertical swinging to a fixed part of the cross member, and the reactance member for the units of each pair extends longitudinally of the frame substantially parallel to the adjoining wheel in the straight ahead position thereof and is fixed to the adjoining control arm.

11. A steering control according to cleam 8 wherein the steerable wheels are front wheels of the vehicle, the wheels are knee action suspended from the frame, each of the cross member end portions mounting the wheels includes a control arm connected for vertical swinging to a fixed part of the cross member, and the reactance means for each unit is fixed to the adjoining control arm.

12. A steering control according to claim 5, wherein the reactance means for each unit includes a pivot bearing slidably receiving the guide rod thereof.

13. A steering control according to claim 5, wherein both springs of each unit are under predetermined compression in the straight ahead position of the turning wheel.

14. A steering control according to claim 13, including means on the control rod of each unit for adjusting compression of the inner spring thereof.

References Cited

UNITED STATES PATENTS

| | | | |
|---|---|---|---|
| 2,993,704 | 7/1961 | Worsham | 280—96.2 |
| 3,333,863 | 8/1967 | Bishop | 280—94 |
| 3,375,020 | 3/1968 | Worsham | 280—96.2 |

FOREIGN PATENTS

| | | |
|---|---|---|
| 12,752 | 10/1928 | Australia. |

KENNETH H. BETTS, *Primary Examiner.*